United States Patent
Bradford (10) Patent No.: US 10,423,421 B2
(45) Date of Patent: Sep. 24, 2019

(54) OPPORTUNISTIC UTILIZATION OF REDUNDANT ALU

(71) Applicant: Intel Corporation, Santa Clara, CA (US)

(72) Inventor: Dennis R. Bradford, Portland, OR (US)

(73) Assignee: Intel Corporation, Santa Clara, CA (US)

(*) Notice: Subject to any disclaimer, the term of this patent is extended or adjusted under 35 U.S.C. 154(b) by 1040 days.

(21) Appl. No.: 13/729,135

(22) Filed: Dec. 28, 2012

(65) Prior Publication Data

US 2014/0189319 A1 Jul. 3, 2014

(51) Int. Cl.
*G06F 9/38* (2018.01)
*G06F 11/00* (2006.01)

(52) U.S. Cl.
CPC .......... *G06F 9/3836* (2013.01); *G06F 9/3885* (2013.01); *G06F 11/00* (2013.01)

(58) Field of Classification Search
CPC .... G06F 11/1629; G06F 11/202; G06F 11/16; G06F 11/1641; G06F 11/165
See application file for complete search history.

(56) References Cited

U.S. PATENT DOCUMENTS

| | | | | |
|---|---|---|---|---|
| 6,785,826 B1* | 8/2004 | Durham | ............... | G06F 1/3203 713/300 |
| 7,624,255 B1* | 11/2009 | Rouet | ..................... | G06F 8/445 712/220 |
| 2003/0065905 A1* | 4/2003 | Ishii | ........................ | G06F 9/325 712/23 |
| 2004/0019771 A1* | 1/2004 | Quach | ................. | G06F 11/1641 712/229 |
| 2006/0064679 A1* | 3/2006 | Ozaki | ................... | G06F 1/3203 717/127 |
| 2006/0200648 A1* | 9/2006 | Falkenberg | ........... | G06F 9/3836 712/214 |
| 2009/0150647 A1* | 6/2009 | Mejdrich | ............ | G06F 9/30036 712/3 |
| 2009/0210665 A1* | 8/2009 | Bradford | ............... | G06F 9/3814 712/215 |
| 2009/0260013 A1* | 10/2009 | Heil | ..................... | G06F 15/7825 718/103 |
| 2012/0210164 A1* | 8/2012 | Gara | ................... | G06F 11/1641 714/10 |

* cited by examiner

*Primary Examiner* — George Giroux
(74) *Attorney, Agent, or Firm* — Alliance IP, LLC (57) ABSTRACT

A processor includes at least one processing core that includes an operation dispatch for dispatching operations from an instruction pipeline, a plurality of arithmetic logic units for executing the operations, a plurality of multiplexers, each of which connects the operation dispatch to a respective arithmetic logic unit, and a controller configured to selectively enable at least one multiplexer to connect the operation dispatch to at least one arithmetic logic unit based on a reliability mode associated with the operation.

22 Claims, 3 Drawing Sheets

OPPORTUNISTIC UTILIZATION OF REDUNDANT ALU

FIELD OF THE INVENTION

The present disclosure pertains to computational reliability, in particular, to systems and methods for increasing computational reliability by opportunistic utilization of redundant computational modules.

BACKGROUND

Central processing unit (CPU) may incur unexpected errors during computation. For example, space radiation may cause a register bit to randomly flip, thus causing computational errors. This type of random errors is not permissible in mission critical operations. Current methods use either temporal redundancy or spatial redundancy to increase the reliability of computational units such as arithmetic logic units (ALUs). Temporal redundancy means to use the same circuit multiple times to repeatedly perform the same operations. The results of these repeated operations may be compared to determine if there is a discrepancy. A discrepancy means that there is an error in the computation. Spatial redundancy means to use multiple copies of the same circuit to perform a same operation and thus compare the results from these circuits to determine if there is discrepancy among the results. Similarly, a discrepancy means that there is an error in the computation.

Temporal redundancy has the advantage of requiring less circuit area (only need one ALU), but has the disadvantage of taking twice as long (and twice execution power consumption) to complete one computation. In contrast, spatial redundancy has the advantage of achieving unity performance, but has the disadvantage of occupying twice circuit area and again twice the execution power consumption. Both temporal and spatial redundancies require only minimal increase in design complexity. Other methods to increase reliability may include residual computation which attempts to minimize the area and power consumption while maintaining unity performance. Unfortunately, the residual computation method significantly increases the design complexity.

DESCRIPTION OF THE FIGURES

Embodiments are illustrated by way of example and not limitation in the Figures of the accompanying drawings.

DETAILED DESCRIPTION

A processor that includes a plurality of ALUs may run in one of the temporal or spatial redundancy mode. For example, a program may be embedded with mode instructions that instruct the processor to run in a normal mode (with no redundancy), or in the temporal redundancy mode, or in the spatial redundancy mode. Alternatively, a compiler may insert hints in a program during compilation of the program. The hints may instruct the processor to run in one of normal, temporal redundancy, and spatial redundancy modes. These methods, however, do not take into consideration the availability of the ALUs. Thus, if the program instructs the processor to run in the spatial redundancy mode and there is no free ALU to execute the spatial redundancy, the processor may need to wait for the availability of this additional ALU. In another example, if there are ALUs available while the instruction is for running temporal redundancy mode, the available ALUs may not be used for spatial redundancy.

In practice, while there are many threads of applications redundantly run among the ALUs of the processor, the availability of ALUs may change in real time and are hard to predict. As processors are designed to achieve maximum performance, multiple execution ports (each of which may correspond to an ALU) may be designed for the processors. The utilization of these execution ports varies significantly across various workloads and on average, many execution ports are underutilized. These underutilized ALUs, when they are available, may be used to execute an operation under the spatial redundancy mode.

Therefore, the rigid, top-down approach that instructs the processor to run in one of the specific normal, temporal redundancy, and spatial redundancy modes may not efficiently utilize the ALUs because this approach does not take into consideration the real-time availability of ALUs. Embodiments of the present invention include methods and apparatus to increase computation reliability by employing underutilized ALUs and data paths in opportunistic fashions. Instead of embedding mode instructions in a program to explicitly instruct the processor to run in a specific mode, embodiments of the present invention may instruct the processor an intermediate layer of reliability modes based on which the processor may determine which specific redundancy mode to run as a function of available ALUs.

Embodiments of the present invention may include a processor. The processor may include at least one processing core that includes an operation dispatch for dispatching operations from an instruction pipeline, a plurality of arithmetic logic units for executing the operations, a plurality of multiplexers, each of which connects the operation dispatch to a respective arithmetic logic unit, and a controller configured to selectively enable at least one multiplexer to connect the operation dispatch to at least one arithmetic logic unit based on a reliability mode associated with the operation.

Embodiments of the present invention may include a computing system that may include a processor. The processor may include at least one processing core that includes an operation dispatch for dispatching operations from an instruction pipeline, a plurality of arithmetic logic units for executing the operations, a plurality of multiplexers, each of which connects the operation dispatch to a respective arithmetic logic unit, and a controller configured to selectively enable at least one multiplexer to connect the operation dispatch to at least one arithmetic logic unit based on a reliability mode associated with the operation.

Embodiments of the present invention may include a method. The method may include retrieving a mode of an operation being dispatched from an operation dispatch, inquiring a number of arithmetic logic units that are available for executing the operation, and selectively enabling at least one multiplexers based on a reliability mode associated with the operation to allow the operation being executed by at least one arithmetic logic unit.

Figure 1:
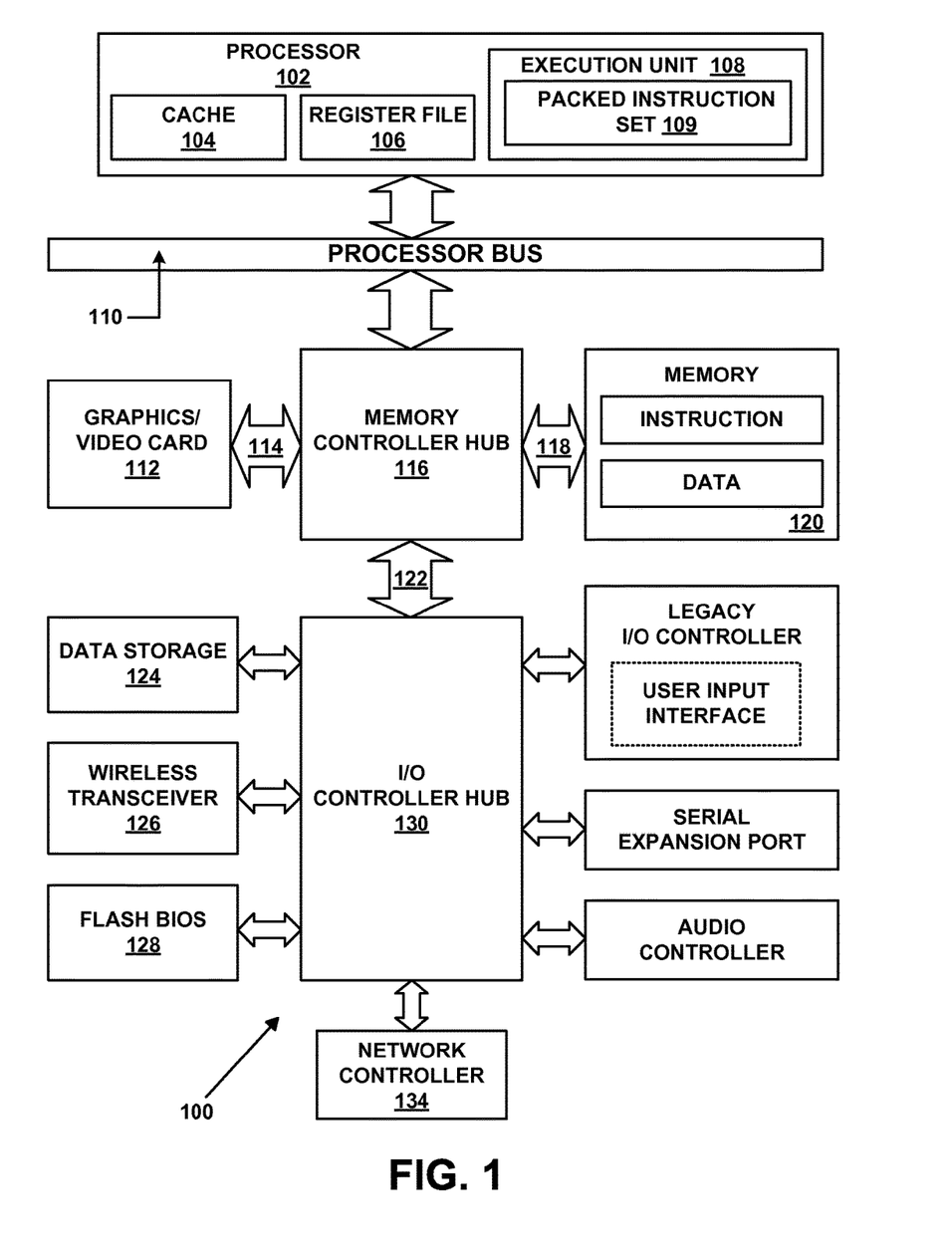
FIG. 1 is a block diagram of a system according to one embodiment of the present invention.

FIG. 1 is a block diagram of a computer system 100 formed with a processor 102 includes one or more execution units 108 to perform an algorithm to perform at least one instruction in accordance with one embodiment of the present invention. One embodiment may be described in the context of a single processor desktop or server system, but alternative embodiments can be included in a multiprocessor system. System 100 is an example of a 'hub' system architecture. The computer system 100 includes a processor 102 to process data signals. The processor 102 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that can transmit data signals between the processor 102 and other components in the system 100. The elements of system 100 perform their conventional functions that are well known to those familiar with the art.

In one embodiment, the processor 102 includes a Level 1 (L1) internal cache memory 104. Depending on the architecture, the processor 102 can have a single internal cache or multiple levels of internal cache. Alternatively, in another embodiment, the cache memory can reside external to the processor 102. Other embodiments can also include a combination of both internal and external caches depending on the particular implementation and needs. Register file 106 can store different types of data in various registers including integer registers, floating point registers, status registers, and instruction pointer register.

Execution unit 108, including logic to perform integer and floating point operations, also resides in the processor 102. The processor 102 also includes a microcode (ucode) ROM that stores microcode for certain macroinstructions. For one embodiment, execution unit 108 includes logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications can be accelerated and executed more efficiently by using the full width of a processor's data bus for performing operations on packed data. This can eliminate the need to transfer smaller units of data across the processor's data bus to perform one or more operations one data element at a time.

Alternate embodiments of an execution unit 108 can also be used in micro controllers, embedded processors, graphics devices, DSPs, and other types of logic circuits. System 100 includes a memory 120. Memory 120 can be a dynamic random access memory (DRAM) device, a static random access memory (SRAM) device, flash memory device, or other memory device. Memory 120 can store instructions and/or data represented by data signals that can be executed by the processor 102.

A system logic chip 116 is coupled to the processor bus 110 and memory 120. The system logic chip 116 in the illustrated embodiment is a memory controller hub (MCH). The processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

In an embodiment, the reliability mode may include a mandatory mode, an aggressive mode, and a limited mode, which may be associated with operations that are passed to the processor. An operation under mandatory mode is always executed redundantly on at least two ALUs regardless whether the availability of ALUs. Thus, if there is no extra ALU for spatial redundancy, the processor may wait until an additional ALU becomes available and at that time, execute the operation redundantly on two ALUs.

An operation under the aggressive mode may aggressively seek opportunities to execute the operation redundantly. Thus, the operation is executed redundantly if an extra idle ALU (i.e., no other operations are running or scheduled to run on the extra execution port) is available. However, if there is no extra idle ALU available, the operation may be executed in a non-redundant mode on a single ALU instead of waiting for an extra ALU becomes available.

An operation under the limited mode may run redundantly on limited scenarios. In an embodiment, the operation may be executed on multiple execution ports if an extra idle execution port is available and certain pre-specified criteria are met. In an embodiment, the additional criteria may be that the operation belongs to a specific class of instructions. In an embodiment, the instructions to be executed redundantly may include specific types of operations (such as "add," "iadd," or "fadd"). In another embodiment, the instructions to be executed redundantly may include specific classes of operators (such as, "×," "+" etc.). In another embodiment, the criteria may be that the operation may be executed redundantly for certain percentage of times. For example, the criteria may specify that the operation may execute redundantly for 50% of time.

In an embodiment, the reliability modes may be inserted by the compiler during compilation of a program. Thus, the reliability modes may be inserted as flags of execution and pushed into the instruction execution pipeline along with operations.

Figure 2:
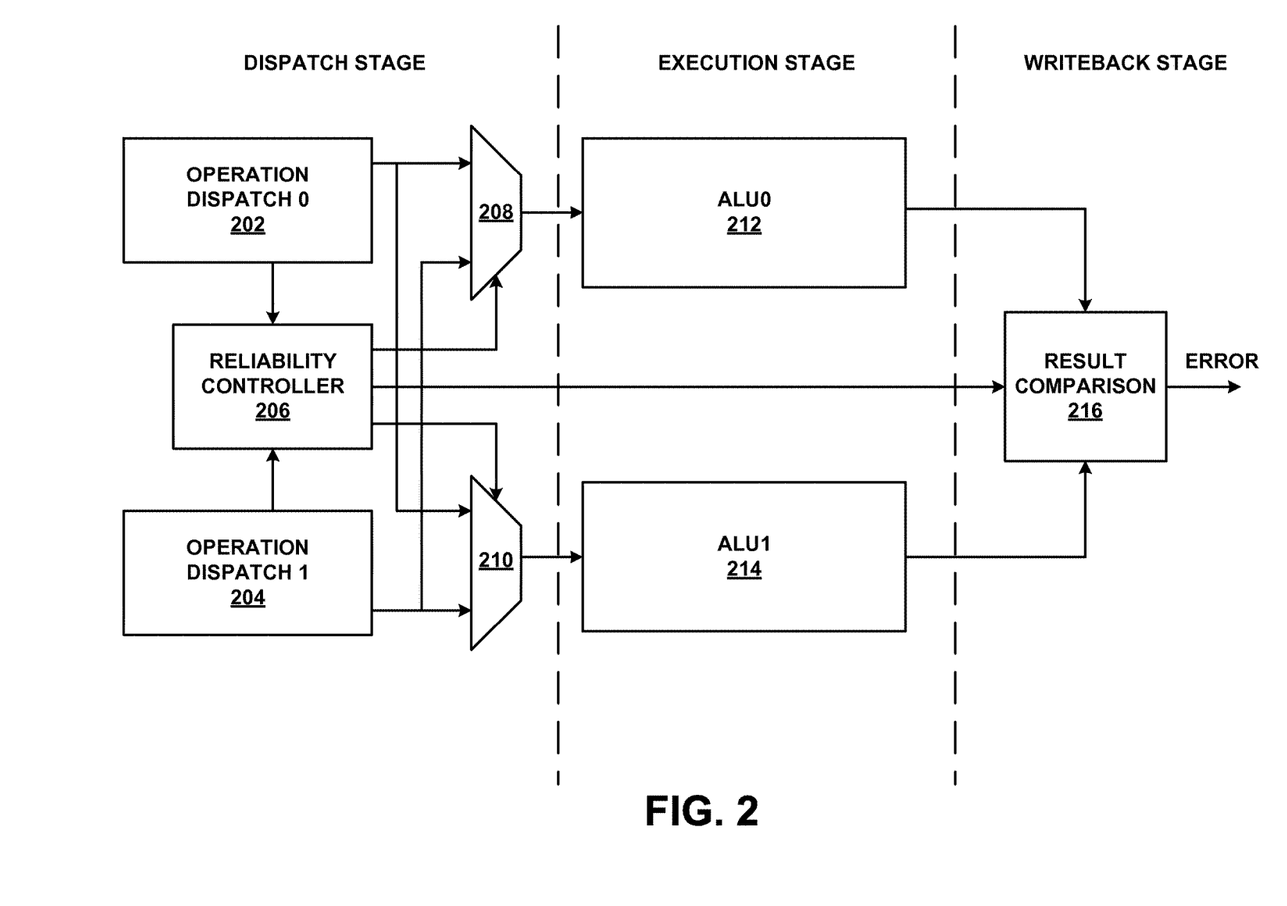
FIG. 2 is a block diagram of components in a processing core according to an embodiment of the present invention.

FIG. 2 illustrates a system that controls instruction execution based on the reliability modes according an embodiment of the invention. The system as shown in FIG. 2 may be part of processor that includes multiple cores. Each core may include a dispatch stage, an execution stage, and a writeback stage. The dispatch stage may include a plurality of operation dispatches, 202, 204 (for clarity purpose, only two dispatches are shown), a controller 206, and a plurality of multiplexers 208, 210 (for clarity purpose, only two multiplexers are shown). The execution stage may include a plurality ALUs 212, 214 (for clarity purpose, only two ALUs are shown). The writeback stage may include a comparator 216. The dispatch stage may dispatch instructions, and detect during the dispatch to determine if a) an execution port being utilized and b) whether correct conditions exist. The execution stage may execute instructions on the ALUs. The writeback stage may compare the results from the redundant execution at different ALUs of the same operation to determine if the results from the execution ports match.

As shown in FIG. 2, the dispatch stage may include a plurality of operation dispatches 202, 204, each of which may include a first output that is connected to the controller 206 and a second output that is connected to a respective input of the plurality of multiplexers 208, 210. Each of the multiplexers 208, 210 may include a control terminal that is connected to an output of controller 206. Each of the plurality of multiplexers 208, 210 may be output to a respective ALU. For example, as shown in FIG. 2, the output of multiplexer 208 is connected to ALU 212, and the output of multiplexer 210 is connected to ALU 214. Outputs of ALUs 212, 214 may be connected to the comparator 216. Further, an output of controller 306 may also be connected to a control terminal of comparator 216.

Controller 206 may include circuit logics that may monitor operations being dispatched on each instruction execution pipeline to be executed on ALUs. Further, controller 206 may have access to a storage device (such as a register or memory) having stored thereon conditions in the form of rules that may be used to determine whether to execute the operations in redundancy. Thus, in response to receiving an operation, controller 206 may first exam what the reliability mode this operation is associated with. The reliability mode may be one of the mandatory mode, aggressive mode, and the limited modes. Depending on the reliability mode and/or conditions, controller 206 may control multiplexers 208, 210 so that the operation may be executed in one or more ALUs.

If the reliability mode of the operation is mandatory (i.e., the operation is required to be executed redundantly on two ALUs), controller 206 may first determine which ALU is available for the execution of the operation. Since the reliability mode is mandatory, controller 206 may need to find at least two ALUs for the requisite redundant execution. If there are two ALUs available for execution, controller 206 may enable the signal paths of multiplexers to connect the operation dispatch to the two available ALUs to allow the operation being executed redundantly on the two ALUs. For example, if the ALU 212, 214 are available for execution, controller 206 may enable multiplexers 208, 210 so that operation dispatches 202, 204 may dispatch the operation to both ALU 212 and ALU 214 redundantly for execution. The execution results by ALU 212, 214 may both be transmitted to comparator 216 which may be enabled by controller 206 and compare the execution results. If there are discrepancies between the execution results, comparator 216 may output an error message.

However, under the mandatory mode, if there are less than two ALUs available, controller may not enable multiplexers 208, 210 until two or more ALUs are available. At the time when two or more ALUs are available, controller 206 may enable two multiplexers to connect the operation dispatch to the two available ALUs to allow the operation be executed on the two available ALUs.

If the reliability mode is aggressive (i.e., the operation is executed redundantly if there are at least two ALUs are available), controller 206 may first determine if there are at least two ALUs available for executing the operation redundantly. If there are at least two ALUs available for executing the operation, controller 206 may enable the multiplexers to connect operation dispatch to selected two available ALUs for execution and later comparison of the execution results at comparator 216. However, on the other hand, if there is only one ALU available, controller 206 may enable a multiplexer to connect the operation dispatch to the available ALU for execution. Since the operation is not executed in redundancy, controller 206 may disable comparator 216 since there is no need for result comparison.

If the reliability mode is limited (i.e., the operation is executed redundantly if there are at least two ALUs are available and certain conditions are met), controller 206 may first determine if there are at least two ALUs available for executing the operation redundantly. If there are at least two ALUs available for executing the operation, controller 206 may further determine if the requisite conditions are met. Controller 206 may retrieve rules that represent the conditions from a storage (not shown) and apply the rules to the operation to determine if the operation meets the conditions. If the conditions are met, controller 206 may enable two multiplexers to connect the operation dispatch to two selected ALUs to execute the operation and enable comparator 216 to compare the execution results. However, if the conditions are not met, the operation may not be executed redundantly. Thus, controller 206 may enable only one selected multiplexer to connect the operation dispatch to be executed in the only one ALU. If only one ALU is available for executing the operation, the operation may be executed only on the ALU regardless the condition is met or not. The order for checking the number of available ALUs and checking the conditions may be exchanged without affecting the final results.

Figure 3:
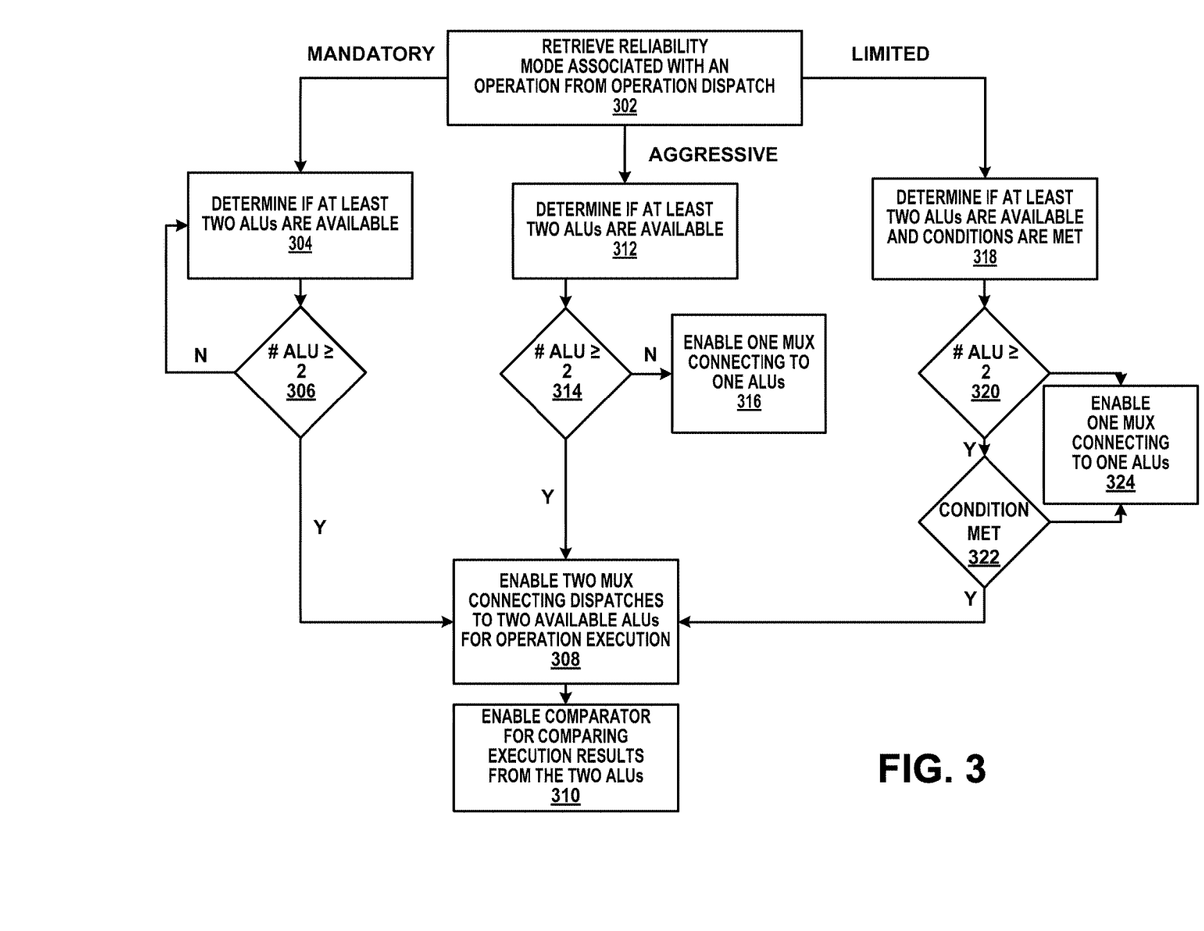
FIG. 3 is a process for reliably executing operations according to an embodiment of the present invention.

FIG. 3 illustrates a process for executing operations according to an embodiment of the present invention. A processor as shown in FIG. 2 may include a reliability controller that may be configured to determine how to execute an operation based on the reliability mode associated with the operation and/or certain conditions. Referring to FIG. 3, at 302, the controller may be configured to in response to an operation being present on an operation dispatch, retrieve the reliability mode associated with the operation. In one embodiment, the reliability mode may include one of a mandatory mode, an aggressive mode, and a limited mode as discussed above. If the mode associated with the operation is determined to be the mandatory mode, at 304, the controller may be configured to determine if there are at least two execution ports (or ALUs) are available for executing the operation. At 306, if the number of available ALUs is determined to be less than two, the controller may be configured to go back to 304 to re-inquire the availability of at least two ALUs. This loop may be repeated until at least two ALUs are available for executing the operation. However, at 306, if the number of available ALUs is determined to be two or more, the controller may be configured to allow the operation being executed redundantly on two ALUs. At 308, the controller may be configured to enable two multiplexers to connect the operation dispatch to two ALUs so that the operation may be dispatched to the two ALUs for redundant execution. In response to the conclusion of the redundant execution, at 310, the controller may be configured to enable a comparator to compare the execution results from the two ALUs. If there are discrepancies between the executions results from the two ALUs, the comparator may send an error message indicating there may be an error in the execution results. If there is no discrepancy in the execution results, the execution results may be accepted for further processing.

If the mode associated with the operation is determined to be an aggressive mode, at 312, the controller may be configured to determine if there are at least two execution ports (or ALUs) are available for executing the operation. At 314, if the number of available ALUs is determined to be less than two, the controller may be configured to allow the operation to be executed in a non-redundant fashion. For example, at 316, the controller may be configured to enable one multiplexer to connect the operation dispatch to the available one ALU so that the operation may be executed. On the other hand, at 314, if the number of available ALUs is determined to be two or more, the controller may be configured to allow the operation being executed redundantly on two ALUs. At 308, the controller may be configured to enable two multiplexers to connect the operation dispatch to two ALUs so that the operation may be dispatched to the two ALUs for redundant execution. In response to the conclusion of the redundant execution, at 310, the controller may be configured to enable a comparator to compare the execution results from the two ALUs. If there are discrepancies between the executions results from the two ALUs, the comparator may send an error message indicating there may be an error in the execution results. If there is no discrepancy in the execution results, the execution results may be accepted for further processing.

If the mode associated with the operation is determined to be a limited mode, at 318, the controller may be configured to determine if there are at least two execution ports (or ALUs) are available for executing the operation. At 320, if the number of available ALUs is determined to be less than two, the controller may be configured to allow the operation to be executed in a non-redundant fashion. For example, at 324, the controller may be configured to enable one multiplexer to connect the operation dispatch to the available one ALU so that the operation may be executed. However, at 320, if the number of available ALUs is determined to be two or more, at 322, the controller may be configured to further determine if a set of pre-specified conditions are met. The conditions may be stored in a storage device and retrieved by the controller. The conditions may be related to the type of operations. If the conditions are not met, the controller may not execute the operation redundantly even if there are two or ALUs are available. For example, at 324, the controller may be configured to enable one multiplexer to connect the operation dispatch to the available one ALU so that the operation may be executed. However, if the conditions are met, the controller may be configured to execute the operation redundantly on two ALUs. At 308, the controller may be configured to enable two multiplexers to connect the operation dispatch to two ALUs so that the operation may be dispatched to the two ALUs for redundant execution. In response to the conclusion of the redundant execution, at 310, the controller may be configured to enable a comparator to compare the execution results from the two ALUs. If there are discrepancies between the executions results from the two ALUs, the comparator may send an error message indicating there may be an error in the execution results. If there is no discrepancy in the execution results, the execution results may be accepted for further processing.

Compared to the known practice, embodiments of the present invention allows for an opportunistic redundant execution of operation of operations based on the real-time availability of ALUs and the requirements of the operation. In this way, the operations may be executed in a more flexible and more efficient manner.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor, comprising:
   at least one processing core that includes:
   a plurality of operation dispatches for dispatching operations from an instruction pipeline;
   a plurality of arithmetic logic unit circuits for executing the operations;
   a plurality of multiplexer circuits, the number of multiplexer circuits being equal to the number of arithmetic logic unit circuits, wherein
   each multiplexer circuit has a plurality of inputs and an output, the number of inputs being equal to the number of operation dispatches, wherein
   each input is connected to a respective operation dispatch, and
   the output is connected to a respective arithmetic logic unit circuit; and
   a controller configured to:
   identify a dispatched operation from one of the operation dispatches;
   determine a reliability mode associated with the dispatched operation;
   determine a number of available arithmetic logic unit circuits for executing the dispatched operation, wherein the number of available arithmetic logic unit circuits is determined based on a real-time availability of the plurality of arithmetic logic unit circuits; and
   selectively enable one or more arithmetic logic unit circuits to execute the dispatched operation non-redundantly or redundantly, wherein the one or more arithmetic logic unit circuits are to be enabled via one or more multiplexer circuits, and wherein the dispatched operation is to be executed non-redundantly or redundantly based on:
   the reliability mode associated with the dispatched operation; and
   the number of available arithmetic logic unit circuits for executing the dispatched operation.

2. The processor of claim 1, wherein the at least one processing core further includes:
   a comparator for comparing execution results from at least two arithmetic logic unit circuits.

3. The processor of claim 2, wherein the reliability mode includes a mandatory mode, an aggressive mode, and a limited mode.

4. The processor of claim 3, wherein if the reliability mode associated with the dispatched operation is the mandatory mode, the controller is configured to:

obtain information from the plurality of arithmetic logic unit circuits to determine the number of available arithmetic logic unit circuits for executing the dispatched operation;

when the number of available arithmetic logic unit circuits is determined to be less than two, repeatedly inquire the plurality of arithmetic logic unit circuits; and when the number of available arithmetic logic unit circuits is determined to be two or more:
  enable two multiplexer circuits that connect the one of the operation dispatches to two of the available arithmetic logic unit circuits to allow the two available arithmetic logic unit circuits to execute the dispatched operation redundantly; and
  enable the comparator to compare results of executing the dispatched operation by the two available arithmetic unit circuits.

5. The processor of claim 4, wherein the comparator indicates an error message if there are discrepancies between the results from the two available arithmetic unit circuits.

6. The processor of claim 3, wherein if the reliability mode associated with the dispatched operation is the aggressive mode, the controller is configured to:
  inquire the plurality of arithmetic logic unit circuits to determine the number of available arithmetic logic unit circuits for executing the dispatched operation;
  when the number of available arithmetic logic unit circuits is determined to be less than two, enable one multiplexer circuit that connect the one of the operation dispatches to the one available arithmetic logic unit to allow the arithmetic unit to execute the dispatched operation; and
  when the number of available arithmetic logic unit circuits is determined to be two or more:
    enable two multiplexer circuits that connect the one of the operation dispatches to two of the available arithmetic logic unit circuits to allow the two available arithmetic logic unit circuits to execute the dispatched operation redundantly; and
    enable the comparator to compare results of executing the dispatched operation by the two available arithmetic unit circuits.

7. The processor of claim 6, wherein the comparator indicates an error message when there are discrepancies between the results from the two available arithmetic unit circuits.

8. The processor of claim 3, wherein if the reliability mode associated with the dispatched operation is the limited mode, the controller is configured to:
  inquire the plurality of arithmetic logic unit circuits to determine the number of available arithmetic logic unit circuits for executing the dispatched operation;
  when the number of available arithmetic logic unit circuits is determined to be less than two:
    enable one multiplexer circuit that connect the one of the operation dispatches to one available arithmetic logic unit to allow the arithmetic unit to execute the dispatched operation;
  when the number of available arithmetic logic unit circuits is determined to be two or more:
    retrieve conditions associated with the dispatched operation from a storage and determine if the conditions associated with dispatched operation are met;
    when the conditions are not met, enable one multiplexer circuit that connect the one of the operation dispatches to one available arithmetic logic unit to allow the arithmetic unit to execute the dispatched operation; and
    when the conditions are met:
      enable two multiplexer circuits that connect the one of the operation dispatches to two of the available arithmetic logic unit circuits to allow the two available arithmetic logic unit circuits to execute the dispatched operation redundantly; and
      enable the comparator to compare results of executing the dispatched operation by the two available arithmetic unit circuits.

9. The processor of claim 8, wherein the comparator indicates an error message when there are discrepancies between the results from the two available arithmetic unit circuits.

10. A system, comprising:
  a memory to store instructions to be executed by a processor;
  the processor including at least one processing core that includes:
    a plurality of operation dispatches for dispatching operations from an instruction pipeline;
    a plurality of arithmetic logic unit circuits for executing the operations;
    a plurality of multiplexer circuits, the number of multiplexer circuits being equal to the number of arithmetic logic unit circuits, wherein
      each multiplexer circuit has a plurality of inputs and an output, the number of inputs being equal to the number of operation dispatches, wherein
        each input is connected to a respective operation dispatch, and
        the output is connected to a respective arithmetic logic unit; and
    a controller configured to:
      identify a dispatched operation from one of the operation dispatches;
      determine a reliability mode associated with the dispatched operation;
      determine a number of available arithmetic logic unit circuits for executing the dispatched operation, wherein the number of available arithmetic logic unit circuits is determined based on a real-time availability of the plurality of arithmetic logic unit circuits; and
      selectively enable one or more arithmetic logic unit circuits to execute the dispatched operation non-redundantly or redundantly, wherein the one or more arithmetic logic unit circuits are to be enabled via one or more multiplexer circuits, and wherein the dispatched operation is to be executed non-redundantly or redundantly based on:
        the reliability mode associated with the dispatched operation; and
        the number of available arithmetic logic unit circuits for executing the dispatched operation.

11. The system of claim 10, wherein the at least one processing core further includes:
  a comparator for comparing execution results from at least two arithmetic logic unit circuits.

12. The system of claim 11, wherein the reliability mode includes a mandatory mode, an aggressive mode, and a limited mode.

13. The system of claim 12, wherein if the reliability mode associated with the dispatched operation is the mandatory mode, the controller is configured to:

inquire the plurality of arithmetic logic unit circuits to determine the number of available arithmetic logic unit circuits for executing the dispatched operation;
if the number of available arithmetic logic unit circuits is determined to be less than two, repeatedly inquire the plurality of arithmetic logic unit circuits; and
if the number of available arithmetic logic unit circuits is determined to be two or more,
    enable two multiplexer circuits that connect the one of the operation dispatches to two of the available arithmetic logic unit circuits to allow the two available arithmetic logic unit circuits to execute the dispatched operation redundantly; and
    enable the comparator to compare results of executing the dispatched operation by the two available arithmetic unit circuits.

14. The system of claim 12, wherein if the reliability mode associated with the dispatched operation is the aggressive mode, the controller is configured to:
inquire the plurality of arithmetic logic unit circuits to determine the number of available arithmetic logic unit circuits for executing the dispatched operation;
if the number of available arithmetic logic unit circuits is determined to be less than two, enable one multiplexer circuit that connect the one of the operation dispatches to the one available arithmetic logic unit to allow the arithmetic unit to execute the dispatched operation; and
if the number of available arithmetic logic unit circuits is determined two or more:
    enable two multiplexer circuits that connect the one of the operation dispatches to two of the available arithmetic logic unit circuits to allow the two available arithmetic logic unit circuits to execute the dispatched operation redundantly; and
    enable the comparator to compare results of executing the dispatched operation by the two available arithmetic unit circuits.

15. The system of claim 12, wherein if the reliability mode associated with the dispatched operation is the limited mode, the controller is configured to:
inquire the plurality of arithmetic logic unit circuits to determine the number of available arithmetic logic unit circuits for executing the dispatched operation;
when the number of available arithmetic logic unit circuits is determined to be less than two,
    enable one multiplexer circuit that connect the one of the operation dispatches to one available arithmetic logic unit to allow the arithmetic unit to execute the dispatched operation;
when the number of available arithmetic logic unit circuits is determined to be two or more;
    retrieve conditions associated with the dispatched operation from a storage and determine if the conditions associated with dispatched operation are met;
    when the conditions are not met, enable one multiplexer circuit that connect the one of the operation dispatches to one available arithmetic logic unit to allow the arithmetic unit to execute the dispatched operation; and
    when the conditions are met:
        enable two multiplexer circuits that connect the one of the operation dispatches to two of the available arithmetic logic unit circuits to allow the two available arithmetic logic unit circuits to execute the dispatched operation redundantly; and
        enable the comparator to compare results of executing the dispatched operation by the two available arithmetic unit circuits.

16. A method of reliable computing, comprising:
retrieving, by a controller, a reliability mode associated with a dispatched operation from one of a plurality of operation dispatches;
determining, by the controller, a number of available arithmetic logic unit circuits for executing the dispatched operation, wherein the number of available arithmetic logic unit circuits is determined based on a real-time availability of a plurality of arithmetic logic unit circuits; and
selectively enabling, by the controller, one or more of the plurality of arithmetic logic unit circuits to execute the dispatched operation non-redundantly or redundantly, wherein:
    the one or more of the plurality of arithmetic logic unit circuits are to be enabled via one or more of a plurality of multiplexer circuits, wherein the number of the plurality of multiplexer circuits is equal to the number of the plurality of arithmetic logic unit circuits, wherein each multiplexer circuit has a plurality of inputs and an output, the number of inputs being equal to the number of operation dispatches, and wherein each input is connected to a respective operation dispatch and the output is connected to a respective arithmetic logic unit; and
    the dispatched operation is to be executed non-redundantly or redundantly based on the reliability mode associated with the dispatched operation and the number of available arithmetic logic unit circuits for executing the dispatched operation.

17. The method of claim 16, wherein controller is in a processing core of a processor.

18. The method of claim 16, wherein the reliability mode includes a mandatory mode, an aggressive mode, and a limited mode.

19. The method of claim 18, wherein if the reliability mode associated with the dispatched operation is the mandatory mode, the method further comprising:
if the number of available arithmetic logic unit circuits is determined to be less than two, repeatedly inquiring the number of available arithmetic logic unit circuits; and
if the number of available arithmetic logic unit circuits is determined to be two or more,
    enabling two multiplexer circuits that connect the one of the plurality of operation dispatches to two of the available arithmetic logic unit circuits to allow the two available arithmetic logic unit circuits to execute the dispatched operation redundantly; and
    enabling a comparator to compare results of executing the dispatched operation by the two available arithmetic unit circuits.

20. The method of claim 18, wherein if the reliability mode associated with the dispatched operation is the aggressive mode, the method further comprising:
if the number of available arithmetic logic unit circuits is determined to be less than two, enabling one multiplexer circuit that connect the one of the plurality of operation dispatches to one available arithmetic logic unit to allow the available arithmetic unit to execute the dispatched operation; and
if the number of available arithmetic logic unit circuits is determined to be two or more,
    enabling two multiplexer circuits that connect the one of the plurality of operation dispatches to two of the available arithmetic logic unit circuits to allow the two available arithmetic logic unit circuits to execute the dispatched operation redundantly; and enabling the comparator to compare results of executing the dispatched operation by the two available arithmetic unit circuits.

21. The method of claim 18, wherein if the reliability mode associated with the dispatched operation is the limited mode, the method further comprising:

if the number of available arithmetic logic unit circuits is determined to be less than two, enabling one multiplexer circuit that connect the one of the plurality of operation dispatches to one available arithmetic logic unit to allow the available arithmetic unit to execute the dispatched operation;

if the number of available arithmetic logic unit circuits is determined to be two or more:

retrieving conditions associated with the dispatched operation from a storage and determining if the conditions associated with dispatched operation are met;

when the conditions are not met, enable one multiplexer circuit that connect the one of the plurality of operation dispatches to one available arithmetic logic unit to allow the arithmetic unit to execute the dispatched operation; and when the conditions are met:

enabling two multiplexer circuits that connect the one of the plurality of operation dispatches to two of the available arithmetic logic unit circuits to allow the two available arithmetic logic unit circuits to execute the dispatched operation redundantly; and enabling the comparator to compare results of executing the dispatched operation by the two available arithmetic unit circuits.

22. The method of claim 17, further comprising:

enabling a comparator to indicate an error message if there are discrepancies between execution results on more than one arithmetic logic unit circuits.

* * * * *